Figures 1, 2:
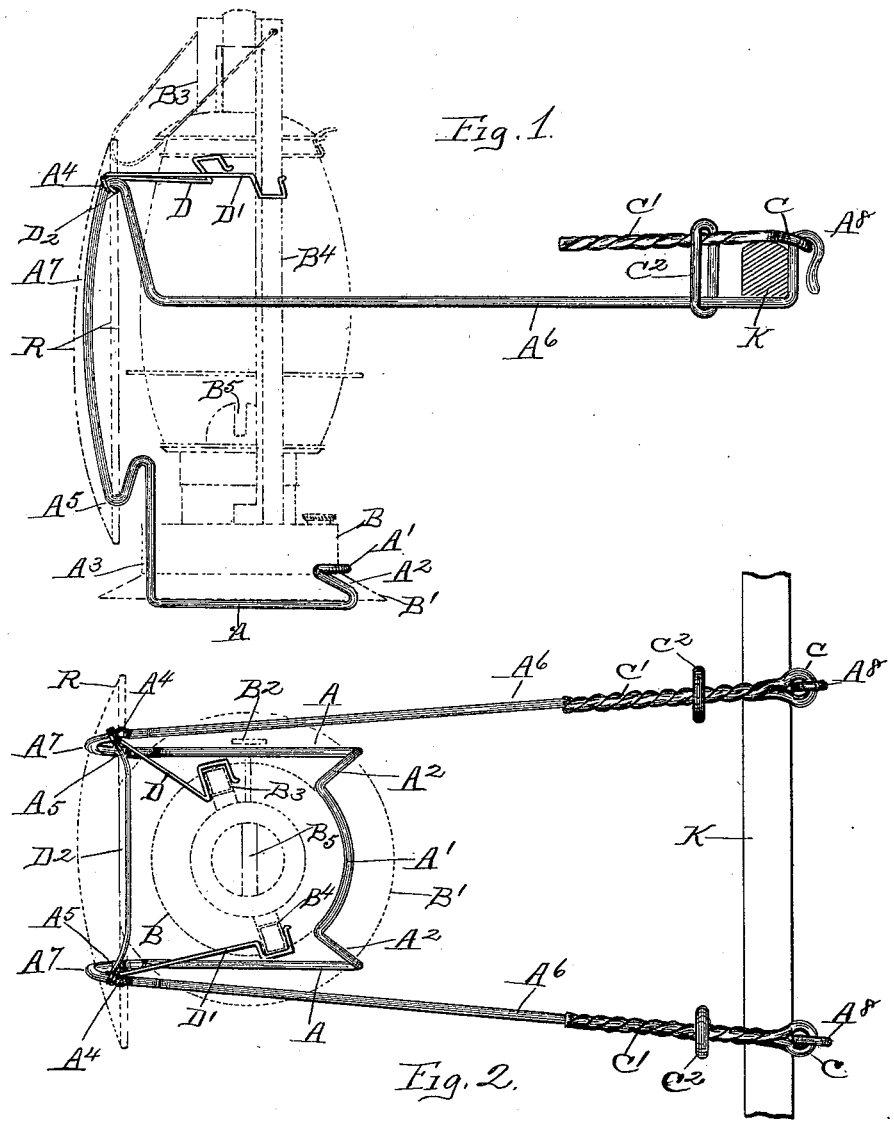

No. 613,511. Patented Nov. 1, 1898.
J. HASKIN.
LANTERN BRACKET.
(Application filed July 11, 1898.)
(No Model.)

Witnesses:
J. D. Curtis.
G. L. Curtis.

Inventor:
Joseph Haskin
By Mosher & Curtis
attys.

UNITED STATES PATENT OFFICE.

JOSEPH HASKIN, OF LANSINGBURG, NEW YORK.

LANTERN-BRACKET.

SPECIFICATION forming part of Letters Patent No. 613,511, dated November 1, 1898.

Application filed July 11, 1898. Serial No. 685,581. (No model.)

*To all whom it may concern:*

Be it known that I, JOSEPH HASKIN, a citizen of the United States, residing at Lansingburg, county of Rensselaer, and State of New York, have invented certain new and useful Improvements in Lantern-Brackets, of which the following is a specification.

The invention relates to such improvements; and it consists of the novel construction and combination of parts hereinafter described and subsequently claimed.

Reference may be had to the accompanying drawings, and the letters of reference marked thereon, which form a part of this specification.

Similar letters refer to similar parts in both figures.

Figure 1 of the drawings is a view in side elevation of my improved lantern-bracket attached to the axle of a vehicle, the positions of the lantern and reflector being indicated by dotted lines. Fig. 2 is a top plan view of the same.

The object of my invention is to securely and detachably support a lantern upon a vehicle in position to illuminate the roadway in advance of the vehicle.

My invention comprises a framework of wire adapted to be attached to the rear axle of a vehicle and to support a lantern and reflector in a suitable position beneath the vehicle.

Referring to the drawings, the main portion of the bracket comprises a piece of wire bent at its middle portion to form the underlying base-wires A A, adapted to form a rest for the base of an ordinary lantern, and the overlying curved portion A', adapted to fit around the oil-chamber B of the lantern and to engage the upper side of the flaring base B' of the lantern. The curved portion A' is connected with the base-wires by the upwardly and inwardly inclined portions $A^2$, which form stops that serve, in conjunction with said curved portion, to hold the lantern against forward movement on the base-wires. The wire frame is provided with the vertical portions $A^3$ at the rear ends of the respective base-wires, which serve to prevent a rearward movement of the lantern upon the base-wires. The ends of the wire are then bent rearwardly and provided with the oppositely and vertically disposed V-shaped bends $A^4$ and $A^5$ and are then bent forwardly and extended to form the attaching-arms $A^6$ $A^6$. The V-shaped bends $A^4$ and $A^5$ are arranged with their open sides one toward the other and are adapted to receive between them a reflector of ordinary concavo-convex form, such as is commonly formed of glass, the reflector being indicated by the dotted lines R in both figures. The V-shaped bends are connected, each lower bend to its respective upper bend, by the curved vertical wires $A^7$, which are adapted to conform to the curvature of the back of the reflector. The forward ends of the attaching-arms may be provided with any known means for detachably securing them to a vehicle-axle. I have shown each arm adapted to pass beneath the axle K and provided on its end with an upwardly-projecting hook $A^8$, adapted to receive an eye C on the end of a clamp rod or bar C', which bears upon the upper side of the axle and extends rearwardly of the same. A clamping-ring $C^2$ embraces both the arm and bar rearwardly of the axle and clamps both upon the axle, thereby holding the bracket in position upon the axle and preventing a rotary movement upon the axle. The clamp-bar is shown formed of a piece of wire bent to form at its middle the eye C and having its ends twisted together to form a bar with an irregular surface over which the clamping-ring cannot easily slip, making it necessary to force the ring along the bar to the desired position and preventing the accidental displacement of the ring.

As a means for supporting the upper part of the lantern I provide the arms D and D', adapted to engage the upper part of the lantern. These arms are formed by the ends of a single piece of wire, which is twisted or bent one or more times around each of the upper bends $A^4$ $A^4$ of the reflector-supports and forms a brace-wire connecting such supports, as at $D^2$. This brace-wire is also adapted to extend across the face of the inserted reflector and aid in supporting the same. It will thus be seen that the main wire frame is braced at the bends $A^4$ $A^4$ and also at the forward ends of the base-wires by the transverse curved portion A', which connects such wires, while the portions of the frame near the lower bends $A^5$ $A^5$ and at the junction of the base-wires with the vertical wires $A^3$ are permitted a considerable lateral movement by the resiliency of the wire.

In inserting a lantern into the bracket the flaring base of the lantern is first inserted beneath the overhanging portion $A'$ of the bracket, the lantern being in a forwardly-inclined position, after which the lantern is brought to a vertical position, thereby forcing the flaring base against the vertical wires $A^3$ at the rear, causing them to separate sufficiently to permit the lantern-base to rest upon the base-wires. When so inserted, the base of the lantern is held by such vertical wires against either longitudinal or transverse horizontal movement upon the base-wires, while the overhanging transverse wire $A'$ prevents a vertical movement.

The reflector is inserted by springing the reflector-supports apart at the lower bends until the reflector can be inserted. The resiliency of the wire will then cause the four bends $A^4 A^4$ and $A^5 A^5$ to engage the reflector at four points on its peripheral edge and hold the same securely.

My improved bracket is especially adapted for use with tubular lanterns which have vertical draft-tubes connecting the top and bottom portions of the lantern outside of the glass shade or chimney. In such lanterns it is customary to have such draft-tubes arranged in a vertical plane which is oblique to the plane of the wick and burner-slot in order that the draft-tubes may not interfere with the operation of the wick-adjusting disk $B^2$. In order to secure the full efficiency of a lantern of this class when used with a reflector, the wick should be in a plane parallel with the plane of the peripheral edge of the reflector, so that the full width of the flame is exposed to the reflector. To secure such a position of the lantern in my improved bracket, I adapt the arms D D' to engage the respective draft-tubes $B^3 B^4$ of the lantern, and I make one of such arms, as D', longer than the other, so that when both are in engagement with the respective draft-tubes the plane of the tubes will extend obliquely to the reflector, while the wick and burner-slot $B^5$ will extend transversely of the bracket in a plane parallel with the plane of the peripheral edge of the reflector, thereby securing the full efficiency of the burner.

By securing the bracket to the vehicle-axle beneath the vehicle the light is thrown by the reflector upon the road-bed in front of the vehicle, exposing the same to view and no part of the light can directly reach the eyes of the driver to interfere with his clearly seeing the lighted portion of the road-bed.

What I claim as new, and desire to secure by Letters Patent, is—

1. The lantern-bracket comprising a piece of wire bent at its middle portion to form the base-wires A A, the overhanging curved portion $A'$ adapted to fit around the front of the oil-chamber, and engage the upper side of the base of a lantern, rear vertical portions $A^3$, the vertically-disposed V-shaped bends $A^4$ and $A^5$, and the forward extensions $A^6$, $A^6$, provided with means for attaching the same to a vehicle-axle, substantially as described.

2. In a lantern-bracket, the combination with a support for the base of a tubular lantern, and supports for a reflector in rear of the lantern-support; of a pair of clamping-arms differing in length and adapted to engage the draft-tubes of the lantern, respectively, substantially as described.

In testimony whereof I have hereunto set my hand this 25th day of June, 1898.

JOSEPH HASKIN.

Witnesses:
FRANK C. CURTIS,
JESSE B. WILBUR.